(12) United States Patent
Park

(10) Patent No.: US 9,335,863 B2
(45) Date of Patent: May 10, 2016

(54) METHOD AND APPARATUS FOR SCROLLING CONTENT IN PORTABLE DEVICE

(75) Inventor: Ji Youn Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 249 days.

(21) Appl. No.: 13/572,262

(22) Filed: Aug. 10, 2012

(65) Prior Publication Data

US 2013/0091459 A1 Apr. 11, 2013

(30) Foreign Application Priority Data

Oct. 6, 2011 (KR) ........................ 10-2011-0101555

(51) Int. Cl.
| | | |
|---|---|---|
| G06F 3/048 | (2013.01) | |
| G06F 3/041 | (2006.01) | |
| G06F 3/0485 | (2013.01) | |
| G06F 3/0488 | (2013.01) | |

(52) U.S. Cl.
CPC ............ *G06F 3/0418* (2013.01); *G06F 3/0485* (2013.01); *G06F 3/04883* (2013.01)

(58) Field of Classification Search
CPC .................... G06F 3/0485; G06F 2203/04806; G06F 3/017; G06F 2201/81
See application file for complete search history.

(56) References Cited

U.S. PATENT DOCUMENTS

| | | | | |
|---|---|---|---|---|
| 6,330,009 B1 * | 12/2001 | Murasaki | .............. | G06F 3/0485 345/684 |
| 6,856,326 B1 | 2/2005 | Zhai | | |
| 7,474,772 B2 | 1/2009 | Russo et al. | | |
| 2003/0078924 A1 * | 4/2003 | Liechty | .................... | G06F 17/18 |
| 2005/0108270 A1 * | 5/2005 | Heesemans | ........ | H04N 5/44543 |
| 2006/0256138 A1 * | 11/2006 | Haneda | .................. | G06F 3/3406 345/684 |
| 2008/0042984 A1 * | 2/2008 | Lim | ..................... | G06F 3/04883 345/173 |
| 2008/0092078 A1 * | 4/2008 | Takeshima | ............ | G06F 3/0485 715/786 |
| 2008/0222552 A1 * | 9/2008 | Batarseh | .................. | G09B 5/02 715/776 |
| 2008/0284741 A1 * | 11/2008 | Hsu | ........................ | G06F 3/0485 345/173 |
| 2009/0289905 A1 * | 11/2009 | Ahn | ..................... | G06F 3/04883 345/173 |
| 2010/0134425 A1 * | 6/2010 | Storrusten | ............. | G06F 3/0425 345/173 |
| 2011/0025720 A1 * | 2/2011 | Jo | ......................... | G06F 3/0485 345/684 |

FOREIGN PATENT DOCUMENTS

| | | |
|---|---|---|
| JP | 07-077971 | 3/1995 |
| JP | 2007-526546 | 9/2007 |
| KR | 1020010078098 | 8/2001 |
| KR | 1020110011388 | 2/2011 |

* cited by examiner

*Primary Examiner* — William Bashore
*Assistant Examiner* — Rayeez Chowdhury
(74) *Attorney, Agent, or Firm* — The Farrell Law Firm, P.C.

(57) ABSTRACT

A scrolling method receiving input values including pointing locations from a pointing device, giving weight to each of pointing locations of the received input values based on the generated time point of each of the received input values, calculating a result value for scrolling of content being displayed using pointing locations which have been given the weight, and controlling the scroll using the calculated result value.

7 Claims, 4 Drawing Sheets

METHOD AND APPARATUS FOR SCROLLING CONTENT IN PORTABLE DEVICE

PRIORITY

This application claims priority under 35 U.S.C. §119(a) to Korean Patent Application No. 10-2011-0101555, which was filed in the Korean Intellectual Property Office on Oct. 6, 2011, the contents of which are incorporated herein by reference.

BACKGROUND OF THE INVENTION

1. Field of the Invention

The present invention relates generally to a method and apparatus for scrolling content, and more particularly, to a method and apparatus for smoothly scrolling content displayed in a screen according to movement of a pointing location.

2. Description of the Related Art

With the recent advances in communication and semiconductor technologies, the distribution and use of portable terminals has rapidly increased. In particular, modern portable terminals are reaching the mobile convergence phase in addition to conventional telephone functions. For example, modern portable terminals provide various functions such as Television (TV) viewing (e.g., Digital Multimedia Broadcasting (DMB) and Digital Video Broadcasting (DVB)), music replay (e.g., Motion Pictures Experts Group Audio Layer-3 (MP3)), photographing, data communication, Internet connection and Near Field Communication (NFC) functions as well as conventional communication functions. As such, the portable terminal needs to be quickly and conveniently controlled, which has led to the increased use of the touch screen.

The touch screen can sense a touch of a touching means such as a finger and a stylus pen, and can calculate the touched location. For example, when a touch is generated in a capacitance-type touch screen, the capacitance of the touched point is changed. When such a change exceeds a threshold, it is deemed that a touch event has been generated, and the position of generation of the touch event can be produced through an algorithm that produces the position of change of the capacitance.

In the conventional portable terminal, when the user touches a screen using a finger, an error tends to occur between the position calculated by the controller of the portable terminal and the position intended by user. Further, even if another touching means such as a stylus pen is used, an error can occur while rendering or processing the input value according to such a touch.

Therefore, an unintended input value is generated in a touch screen, the value is reflected in the scroll of content being displayed, and a screen trembling occurs.

SUMMARY OF THE INVENTION

The present invention has been made in view of the above problems, and provides a method and apparatus for scrolling content to prevent a screen trembling and enable smooth scrolling of content by removing or compensating an unintended input value.

In accordance with an aspect of the present invention, a scrolling method includes receiving input values including pointing locations from a pointing device, giving weight to each of pointing locations of the received input values based on the generated time point of each of the received input values, calculating a result value for scrolling of content being displayed using pointing locations which have been given the weight, and controlling the scroll using the calculated result value.

In accordance with another aspect of the present invention, a scrolling apparatus includes a pointing unit that generates input values including pointing locations in response to user's manipulation, a storage unit that stores input values including the pointing locations generated in the pointing unit, and the generated time points of the input values, a controller that gives weight to each of the pointing locations of the stored input values based on generated time points of each of the input values stored in the storage unit, and controls scrolling of content using pointing locations which have been given the weight, and a display unit that displays content scrolled by the controller.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS OF THE INVENTION

Figure 1:
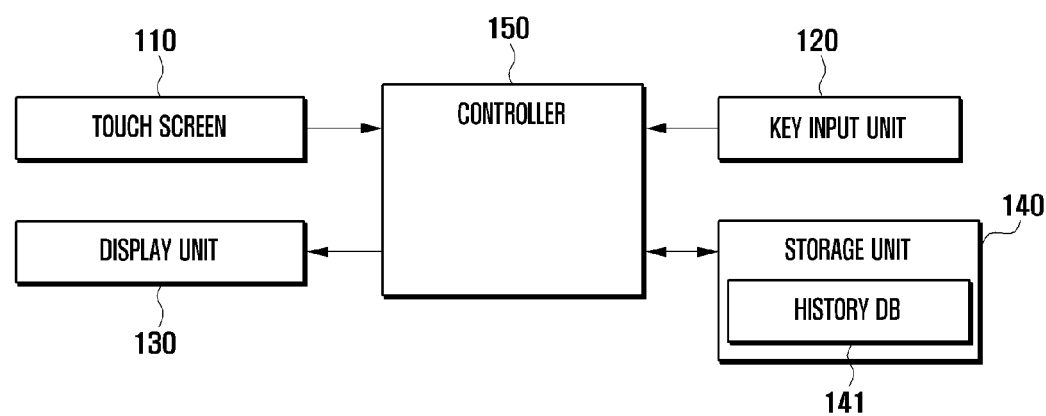
FIG. 1 illustrates components of a scrolling apparatus according to the present invention.

Embodiments of the present invention are described with reference to the accompanying drawings in detail. The same reference numbers are used throughout the drawings to refer to the same or similar parts. Detailed descriptions of well-known functions and structures incorporated herein may be omitted for the sake of clarity and conciseness.

The scrolling apparatus according to the present invention can be applied to all information communication devices and multimedia devices such as a mobile phone, a smart phone, a tablet Personal Computer (PC), a handheld PC, a Portable Multimedia Player (PMP), a Personal Digital Assistant (PDA), a music player (e.g., an MP3 player), a portable game terminal, a digital broadcast player, a High Definition Television (HDTV), a smart TV and a 3-Dimensional (3D) TV. The scrolling apparatus can also be applied to appliances such as a home theater system.

The scrolling apparatus according to the present invention includes a pointing device. Such a pointing device, for example, is a light pen, a mouse, a touch pad, a track ball or a touch screen. Herein, it is assumed that the pointing device is a touch screen.

When a user touches a screen, an input value including a touched point transmitted from a touch screen to a controller is often different from the user's intention. Generally, in the case of a mouse, the location of a pointer displayed on a screen is accurate. In contrast, in the case of a touch screen, because the screen is usually touched by a finger, there is an error in the location calculated by the controller compared to the location intended by user. When the user rapidly moves his/her finger, the user believes that the scrolling device generates regular input values.

However, in fact, irregular input values are generated due to the above-explained errors. Further, even when the finger is not moving, errors are generated due to minute trembling. The touch screen transmits an input value, which reflects such errors, to the controller of the scrolling device. As such, an unintended screen trembling can occur. Further, in response to a user's rapid screen manipulation, the touch screen regularly transmits input values to the controller. However, the input values are not transmitted to the controller in real time due to rendering or processing of the values. Hence, the input values generated in the touch screen are not transmitted to the controller in real time, causing a high probability of a screen trembling.

The scrolling apparatus of the present invention prevents a screen trembling phenomenon, revises input values for smooth scrolling, and reflects result values according to such revision in the scroll of the content. Specifically, the scrolling apparatus of the present invention reflects the input values in the scroll of content only when the location change of the input values exceeds a threshold. Hence, a screen trembling is prevented. However, even the instance when the input value exceeds the threshold may be against the user's intention. This can be improved by an averaging method.

That is, the scrolling apparatus of the present invention stores input values in the history Database (DB), averages the stored input values, and reflects the averaged values in the scroll of content. Further, the scrolling apparatus according to the present invention gives weight to input values based on the generated time point of the input values, averages the input values, which were given such time weight, and reflects the averaged values in the scroll of content. That is, the scroll apparatus according to the present invention does not simply average input values, but averages input values after giving increased weight to input values intended by the user. As such, unintended input values are removed or compensated, and smooth scrolling is enabled.

FIG. 1 illustrates components of a scrolling apparatus according to the present invention. Referring to FIG. 1, the scrolling apparatus of the present invention includes a touch screen 110, a key input unit 120, a display unit 130, a storage unit 140 including a history DataBase (DB), and a controller 150.

The touch screen is installed on the front of the display unit 130, and generates an input value (a touch event) and transmits to the controller 150 in response to user's manipulation on the touch screen 110. Such a manipulation can be divided into a touch, a tap, a double tap, a press, a drag, a drag & drop, a flick, and a drag & flick.

The touch is a pushing of one point of a screen, a tap is a touching of one point with a finger and then detaching or dropping the finger without movement of the finger, a double tap is consecutively tapping two times, a press is a touching of one point relatively longer than the tap and then detaching the finger without a movement of the finger, a drag is a moving of a finger in a preset direction while touching one point, a drag & drop is a dragging and then detaching of the finger, and a flick is a moving of a finger quickly and then detaching the finger. Dragging is also called scrolling, and a flick is also called a sweep. A drag & flick is a flicking at a certain time point while dragging (that is, consecutive manipulation of dragging and flicking when a finger contacts the touch screen 110). The controller 150 can distinguish flicking from flicking by the movement speed. The controller 150 controls the display unit 130 in response to such an input value.

The key input unit 120 comprises a plurality of keys for operating the scrolling apparatus, and transmits the key signal to the controller 150, which controls the display unit 130 in response to such a key signal. The key signal can be divided into a power on/off signal, a volume adjustment signal, and a screen on/off signal.

The display unit 130 converts image data inputted from the controller 150 into analog signals, and displays the converted data. That is, the display unit 130 displays various screens according to the use of the scrolling apparatus, such as a locking screen, a home screen, and an application execution screen. The locking screen is an image displayed when a power on signal on the display unit 130 is generated.

For example, when the trace of the drag coincides with the preset trace, the controller 150 converts an image displayed in the screen from the locking screen to the home screen or the application execution screen. The home screen is an image including multiple icons for executing an application. If the user touches an icon, the controller 150 can execute the corresponding application and convert the displayed image from the home screen to the application execution screen.

The display unit 130 can be formed as a flat display panel such as a Liquid Crystal Display (LCD), an Organic Light Emitting Diode (OLED), and an Active Matrix Organic Light Emitting Diode (AMOLED). Further, the display unit 130 can display a left eye image and a right eye image, and can include a 3D implementation unit so that user can experience the sense of depth for the left eye/right eye images. The 3D implementation method is divided into an eye-glass method and a non-eye-glass method as already known. The eye-glass method includes a color filter method, a polarizing filter method and a shutter glass method, and the non-eye-glass method includes a lenticular lens method, and a parallax barrier method.

The storage unit 140 stores a screen to be outputted in the display unit 130 as well as an application that is necessary in the present invention. The storage unit 140 can also store a key map or a menu map. for operating the touch screen 110. The key map is, for example, a keyboard map, a 3*4 key map, a QWERTY key map, or a control key map for controlling an application currently being executed. The menu map is for controlling an application currently being executed.

The storage unit 140 includes a program area and a data area. The program area stores an operating system for booting the scrolling apparatus and operating each of the above described components, and an application program for supporting various user functions such as for supporting a calling function, a web browser for connecting to an Internet server, an MP3 user function for replaying other sound sources, an image output function for replaying a picture, and a function for replaying moving pictures.

The data area stores data generated by the controller according to the user of the scrolling apparatus. In particular, the data area includes a history DB 141, which stores input values transmitted from the controller 150. Each of the input values includes a coordinate value indicating a touch point for the touch screen 110 and a touch generation time point related to the coordinate value.

The controller 150 controls operation of the scrolling apparatus and a signal flow between internal components of the scrolling apparatus, and further controls power supply to internal components from a battery (not shown). When an input value is received from the touch screen 110, the controller 150 of the present invention determines whether the received input value is valid for controlling the display unit 130. That is, the controller 150 compares location variation of the received input values with the threshold. If the variation is greater than the threshold, the controller 150 determines that the received input value is a valid value, and transmits the value to the history DB 141.

Further, the controller 150 can delete all input values stored in the history DB 141. That is, if the user's hand is released from the touch screen 110 to terminate dragging, the touch screen 110 transmits the related touch event to the controller 150. As such, the controller 150 can reset the history DB 141.

The controller 150 of the present invention generates a result value for a content scroll using input values stored in the history DB 141, and controls the display unit 130 based on such a result value.

Specifically, it is assumed that the controller 150 transmits input values shown in Table 1 below to the history DB 141. Table 1 shows examples of input values stored in the history DB 141, and methods of expressing location and time of input values are not limited to the values in Table 1. Further, the time intervals between generated time points have been exaggerated in Table 1, for the convenience of explanation. The controller 150 calculates the elapsed time (elapsed time=Current time point−generated time point) of each of the input values based on the current time point. Table 1 shows the ages of input values assuming that the current time point is 00:00:10.

TABLE 1

|  | Number of Input Value | | | | |
| --- | --- | --- | --- | --- | --- |
|  | 1 | 2 | 3 | 4 | 5 |
| Coordinate value (x, y) | (0, 0) | (0, 5) | (0, 7) | (0, 9) | (0, 10) |
| Generated time | 00:00:01 | 00:00:04 | 00:00:05 | 00:00:07 | 00:00:08 |
| Age of Input Value (In Case Current Time Point is 00:00:10) | 9 seconds | 6 seconds | 5 seconds | 3 seconds | 2 seconds |

The controller 150 selects input values to be given weight among input values stored in the history DB 141. Specifically, the controller 150 determines the number of samplings using age limit values and time intervals. The age limit value is for selecting input values generated after a generated time point among input values stored in the history DB 141, and the time interval refers to unit time for giving weight to the selected input value. Such an age limit value and time interval can be variously determined in advance.

Assuming that the age limit value is 5 seconds and the time interval is 1 second, the number of samplings (samplings=age limit value/time interval) is determined as 5 as shown in Table 2 below, and the sampling time becomes 0-1, 1-2, 2-3, 3-4 and 4-5 seconds. The controller 150 selects input values corresponding to each sampling time. As an example, referring to FIG. 2, the controller 150 selects an input value, which corresponds to the age closest to the initial value of the sampling time among the ages exceeding the initial value of the sampling time, as an input value corresponding to the sampling time. The present invention is not limited to this input value selection method.

TABLE 2

|  | Sampling Time | | | | |
| --- | --- | --- | --- | --- | --- |
|  | 0~1 seconds | 1~2 seconds | 2~3 seconds | 3~4 seconds | 4~5 seconds |
| Number of Selected Input Value | 5 | 5 | 4 | 3 | 3 |

TABLE 2-continued

|  | Sampling Time | | | | |
| --- | --- | --- | --- | --- | --- |
|  | 0~1 seconds | 1~2 seconds | 2~3 seconds | 3~4 seconds | 4~5 seconds |
| Coordinate Value (x, y) | (0, 10) | (0, 10) | (0, 9) | (0, 7) | (0, 7) |
| Result Value | {(0, 10) * 2 + (0, 9) * 1 + (0, 7) * 2}/5 = (0, 8.6) | | | | |

The controller 150 gives weight to each of coordinate values of selected input values based on time intervals between current time points and generated time points. Specifically, the controller 150 can give weight to each of coordinate values of selected input values in proportion to each of the time intervals.

Referring to Table 1 above, the time interval between the generated time point of input value No. 3 and the generated time point of input value No. 4 is 2 seconds, the time interval between the generated time point of input value No. 4 and the generated time point of input value No. 5 is 1 second, and the time interval between the generated time point of input value No. 5 and the current time point is 2 seconds. In such a case, the controller 150 gives weight of two times to input value Nos. 3 and 5 than No. 4. Thus, the input value Nos. 3 and 5 are closer to the input value intended by user than input value No. 4.

The controller 150 generates result values, shown in Table 2, by averaging the selected coordinate values that were respectively given weight. The controller 150 determines the generated result value as the point touched at the current time point, and controls the scroll of the content based on such a determined touched point.

Although not illustrated in FIG. 1, the scrolling apparatus of the present invention may further include components having additional functions, such as a mobile communication module for calling with a base station, a near field communication module for near field communication, a broadcast receiving module for receiving a broadcast, a digital sound source replay module such as an MP3 module, and an Internal communication module for an Internet function. Such components can be variously modified according to the convergence trend of digital devices.

Figure 2:
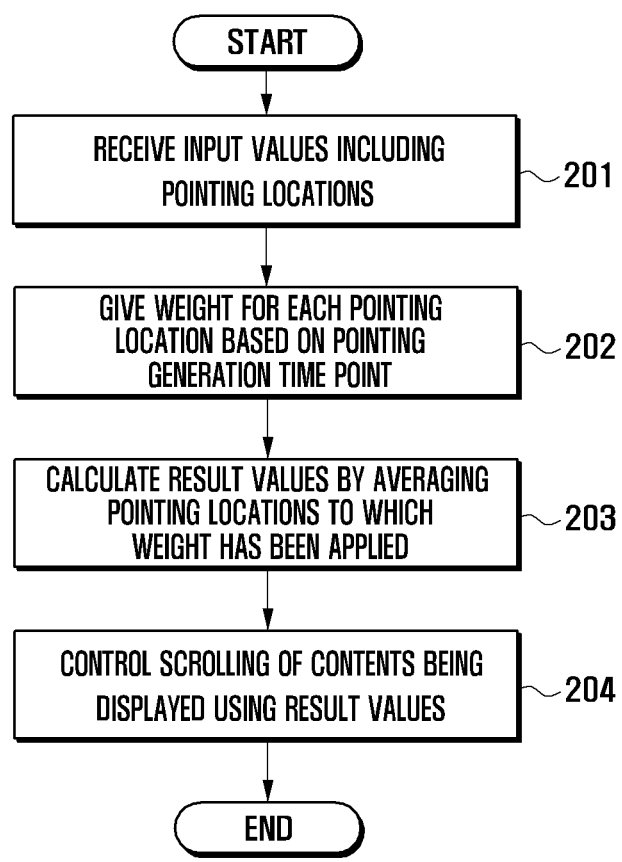
FIG. 2 illustrates a scrolling method according to an embodiment of the present invention.

FIG. 2 illustrates a scrolling method according to an embodiment of the present invention. Referring to FIGS. 1 and 2, the controller 150 receives pointing points from a pointing device in step 201, such as a touch screen 110. The touch screen 110 can sense the touch through the change of physical quantity (e.g., capacitance and current.) according to contact with a touching means, such as a user's hand or a pen, and can transmit the type of the touch and the touched input coordinates to the controller 150.

For example, when the touch screen 110 is a touch panel of a capacitance method and is approached by a finger, the touch screen 110 senses a hand touch through a change in the current, and transmits the sensing the controller 150. If the change in the transmitted current is greater than the reference value, the controller 150 can determine that a finger has approached a certain area of the touch screen 110, and can calculate the approached location, that is, the coordinate value.

When the touch screen 110 is a touch panel of an electromagnetic induction method, a touch of the ElectroMagnetic Resonance (EMR) pen of the touch screen can be sensed. The touch screen 110 may also be a multiple touch panel formed of both a capacitance method and an electromagnetic induction method. When the touch screen 110 is the multiple touch panel, the controller 150 can concurrently receive an input value according to a hand touch and an input value according to a pen touch. That is, user can manipulate a pen when a finger touches the screen, and as such, different input values can be concurrently generated.

In such a case, the controller 150 can disregard the hand touch and perform scrolling based on the input values according to the pen touch. The scrolling can also be performed based on the input values according to the hand touch. As explained above, the pointing device is not limited to a touch screen, and may alternatively be a mouse.

The controller 150 can determine the time point, at which the input value is received from the touch screen 110, as the generated time point of the input value, and can select part of the received input values based on the generated time point. That is, the controller 150 can select input values generated during a preset time based on the current time point among the received input values. When a user does not manipulate the touch screen 110 based on there being no received input value for the preset time period, the controller 150 can terminate the process without performing steps 202 to 204 below.

The controller 150 gives weight to the corresponding pointing location of the selected input values based on the generated time point of each of the selected input values in step 202. That is, step 202 is a process for giving more weight to input values intended by the user than other unintended input values among selected input values. This has been illustrated with reference to FIGS. 1 and 2 above, and thus a detailed description is omitted here.

The controller 150 calculates result values for scrolling content using the pointing locations that have been respectively given weight in step 203. A method of averaging the pointing locations, which were respectively given weight, can be used for such a calculation. That is, step 203 is a process for compensating or removing input values unintended by the user. This has been illustrated with reference to FIGS. 1 and 2 above, and thus a detailed description is omitted here.

The controller 150 controls the scroll of the content being displayed using the calculated result values in step 204. The currently calculated result value and the previously calculated result value can be the same within an error range. That is, the two result values may be the same when a user maintains a touch state at one point. In such a case, the controller 150 controls the display unit 130 to maintain the display content in the current state. In contrast, when there is a change in the result value, the controller 150 controls the scroll of the content being displayed.

Figure 3:
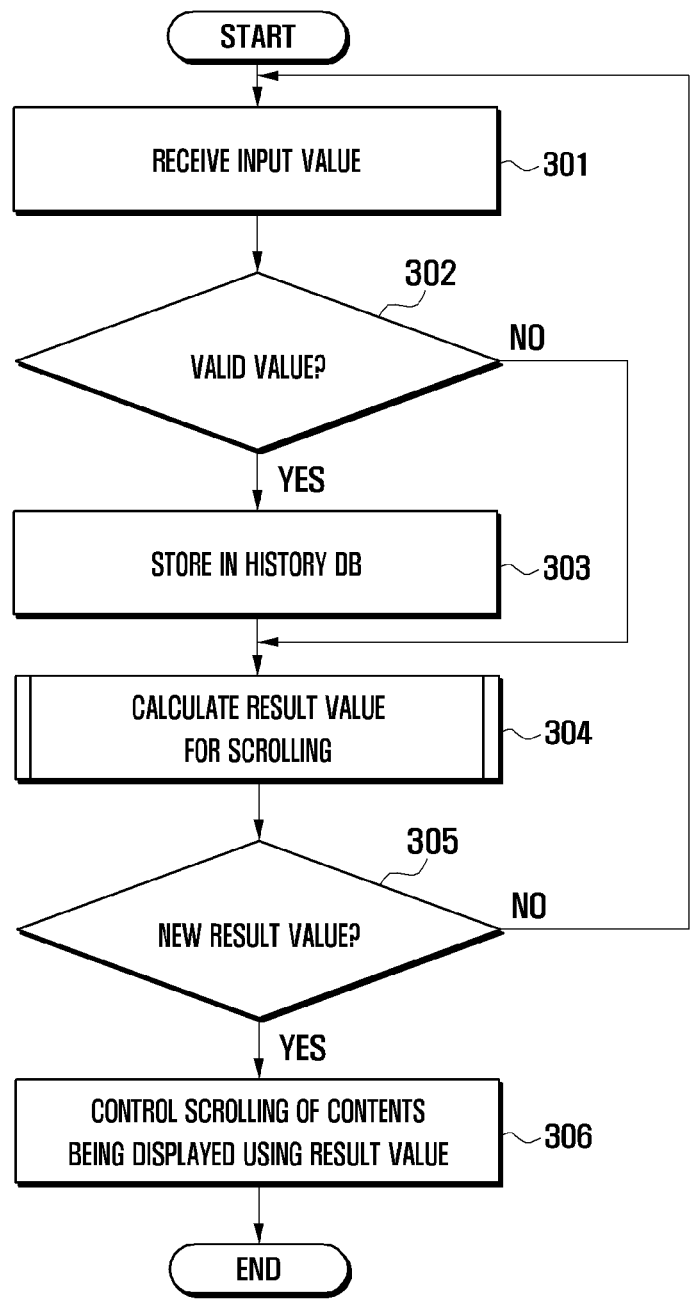
FIG. 3 illustrates a scrolling method according to another embodiment of the present invention.

FIG. 3 illustrates a scrolling method according to another embodiment of the present invention. Referring to FIGS. 1 to 3, the controller 150 receives an input value including the pointing location from the pointing device in step 301.

The controller 150 determines whether the received input value is a valid value in step 302. Specifically, the controller 150 calculates the coordinate value of the currently received input value, as well as the location variance between the calculated coordinate value and the coordinate value of the previously received input value. The controller 150 compares the calculated location variance with the threshold. As a result of the comparison, if the variance is greater than the threshold, the controller 150 determines that the received input value is valid, and otherwise the controller 150 determines that the received input value is invalid. That is, step 302 is a process for removing input values unintended by the user from the received input values.

As a result of the determination at step 302, if the received input value is valid, the controller 150 transmits the coordinate value of the received input value and the generate time point to the history DB 141 in step 303.

Figure 4:
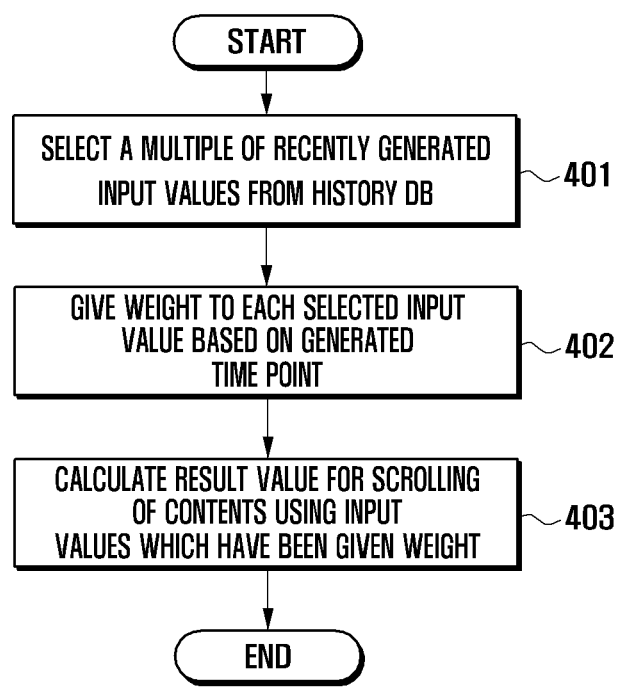
FIG. 4 illustrates a method of calculating a result value for controlling content according to an embodiment of the present invention.

The controller 150 calculates result values for scrolling using input values stored in the history DB 141 in step 304, which will be explained below with reference to FIG. 4.

The controller 150 determines whether the calculated result value is a new value in step 305, by comparing the currently calculated result value with the previously calculated result value. As a result of the comparison, if the difference between the two result values is beyond the error range, the controller 150 proceeds to step 306 by determining the currently calculated result value as a new value. In contrast, if the difference between the two result values is within the error range, the controller 150 returns to step 301.

As a result of the determination at step 305, if the result value is new, the controller 150 controls the scroll of the content being displayed using the calculated result value in step 306.

FIG. illustrates a method of calculating a result value for controlling content according to an embodiment of the present invention. Referring to FIG. 4, the controller 150 selects a multiple of input values recently generated in the history DB 141 in step 401. That is, step 401 is a process for selecting one or more input values stored during a preset period based on the current time point. An example of such an input value selection process has been explained with reference to Tables 1 and 2 above, and thus will be omitted.

The controller 150 gives weight to each of the input values selected based on the generated time point in step 402, and calculates result values for scrolling content using the pointing locations which have respectively been given weight in step 403. A method of averaging the pointing locations, which have been given weight, respectively, can be used for such a calculation.

The foregoing method for changing a screen size using a multi-touch of the present invention may be implemented in an executable program command form by various computer means and be recorded in a computer readable recording medium, including a program command, a data file, and a data structure individually or a combination thereof. The program command recorded in a recording medium may be specially designed or configured for the present invention or be known to a person having ordinary skill in a computer software field to be used.

The computer readable recording medium includes Magnetic Media such as a hard disk, floppy disk, or magnetic tape, Optical Media such as a Compact Disc Read Only Memory (CD-ROM) or Digital Versatile Disc (DVD), Magneto-Optical Media such as a floptical disk, and a hardware device such as ROM, Random Access Memory (RAM), flash memory storing and executing program commands. The program command includes a machine language code created by a complier and a high-level language code executable by a computer using an interpreter. The foregoing hardware device may be configured to be operated as at least one software module to perform an operation of the present invention.

As described above, the present invention gives relatively more weight to input values intended by a user than other input values, calculating a result value for content scroll, and reflecting the calculated values to the control of content scroll. Thus, input values that have lesser weight, that is, which are not intended by the user, are removed or compensated, so that screen trembling is prevented and smooth scrolling is enabled.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A scrolling method, comprising:
   receiving input values including pointing locations from a pointing device;
   storing the received input values in a storage unit;
   selecting input values, which are stored during a preset time period, from the storage unit;
   giving weight to each pointing location of the selected input values in proportion to a difference in time between successively generated time points of the selected input values from a beginning of the preset time period to a current time point, wherein the generated time points are time points when the input values are generated, and wherein the preset time period is a period of time that ends at the current time point;
   calculating a result value for scrolling of content being displayed by averaging pointing locations which have been given the weight; and
   controlling the scroll using the calculated result value.

2. The scrolling method of claim 1, wherein the scroll is controlled when the difference between the calculated result value and a previous result value exceeds an error range after comparing the calculated and previous result values.

3. The scrolling method of claim 1, wherein the received input values include touch points from a touch screen.

4. A scrolling apparatus, comprising:
   a pointing unit configured to generate input values including pointing locations in response to a user's manipulation;
   a storage unit configured to store input values including the pointing locations generated in the pointing unit, and generated time points of the input values;
   a controller configured to:
     select input values, which are stored during a preset time period, from the storage unit,
     give weight to each of the pointing locations of the selected input values in proportion to a difference in time between successively generated time points of the selected input values from a beginning of the preset time period to a current time point, wherein the generated time points are time points when the input values are generated, and wherein the preset time period is a period of time that ends at the current time point,
     calculate a result value for scrolling of content being displayed by averaging the pointing locations which have been given the weight, and
     control scrolling of content using the calculated result value; and a display unit configured to display content scrolled by the controller.

5. The scrolling apparatus of claim 4, wherein the controller is further configured to control a scroll when a difference between the calculated result value and a previous result value exceeds an error range after comparing the calculated and previous result values.

6. The scrolling apparatus of claim 4, wherein the controller is further configured to calculate a location variance of a received input value when the input value is received from the pointing unit, and to transmit the received input value to the storage unit when the calculated location variance is equal to or greater than a threshold.

7. The scrolling apparatus of claim 4, wherein the pointing unit includes a touch panel that senses at least one of a hand touch and a pen touch.

* * * * *